United States Patent
Ancelin et al.

(10) Patent No.: US 12,030,550 B2
(45) Date of Patent: Jul. 9, 2024

(54) STEERING COLUMN FOR A MOTOR VEHICLE AND METHOD FOR ADJUSTING A STEERING COLUMN

(71) Applicants: thyssenkrupp Presta AG, Eschen (LI); thyssenkrupp AG, Essen (DE)

(72) Inventors: Matthias Ancelin, Reichenberg (CH); Balint Kalman Nagy, Gams (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/012,354

(22) PCT Filed: Jun. 25, 2021

(86) PCT No.: PCT/EP2021/067445
§ 371 (c)(1),
(2) Date: Dec. 22, 2022

(87) PCT Pub. No.: WO2022/002768
PCT Pub. Date: Jan. 6, 2022

(65) Prior Publication Data
US 2023/0249738 A1     Aug. 10, 2023

(30) Foreign Application Priority Data

Jun. 30, 2020   (DE) .................... 10 2020 208 164.6

(51) Int. Cl.
*B62D 1/185*     (2006.01)
*B62D 1/181*     (2006.01)
*B62D 1/19*      (2006.01)

(52) U.S. Cl.
CPC ............. *B62D 1/185* (2013.01); *B62D 1/181* (2013.01); *B62D 1/197* (2013.01)

(58) Field of Classification Search
CPC ......... B62D 1/181; B62D 1/184; B62D 1/185
See application file for complete search history.

(56) References Cited

U.S. PATENT DOCUMENTS

2002/0195291 A1   12/2002   Nonogaki
2010/0224145 A1    9/2010   Mueller
(Continued)

FOREIGN PATENT DOCUMENTS

CN      208827919 U       5/2019
CN      114919639 A   *   8/2022   ............... B62D 1/19
(Continued)

OTHER PUBLICATIONS

English Translation of International Search Report issued in PCT/EP2021/067445, dated Aug. 30, 2021.

*Primary Examiner* — Nicole T Verley
(74) *Attorney, Agent, or Firm* — thyssenkrupp North America, LLC

(57) ABSTRACT

A steering column for a motor vehicle may include an inner casing in which a steering spindle is mounted rotatably about a longitudinal axis that extends in a longitudinal direction and is received in an outer casing in a slidingly adjustable manner in the longitudinal direction. A pretensioning apparatus may have a pressure piece that can be braced from an outside in a tensioning direction transversely to the longitudinal axis against the inner casing. The pressure piece is held in the longitudinal direction on the outer casing and is supported against a fixing element counter to the tensioning direction. The fixing element is fixed in a recess of the outer casing. The fixing element has a forming means that is plastically furrowed into the recess, and/or the recess has a forming means that is plastically furrowed into the fixing element.

11 Claims, 3 Drawing Sheets

(56) References Cited

U.S. PATENT DOCUMENTS

| | | |
|---|---|---|
| 2015/0135882 A1 | 5/2015 | Rauber et al. |
| 2016/0068181 A1 | 3/2016 | Warashina |
| 2019/0061802 A1 | 2/2019 | Inoue et al. |
| 2021/0269081 A1 | 9/2021 | Huber et al. |
| 2021/0309282 A1 | 10/2021 | Rist et al. |

FOREIGN PATENT DOCUMENTS

| | | | |
|---|---|---|---|
| DE | 212006000020 U1 | 11/2007 | |
| DE | 10 2009 019 189 A1 | 11/2010 | |
| DE | 102018213679 A1 | 2/2020 | |
| DE | 102020208164 A1 * | 12/2021 | ............. B62D 1/181 |
| WO | 2020/011771 A1 | 1/2020 | |

* cited by examiner

STEERING COLUMN FOR A MOTOR VEHICLE AND METHOD FOR ADJUSTING A STEERING COLUMN

CROSS REFERENCE TO RELATED APPLICATIONS

This application is a U.S. National Stage Entry of International Patent Application Serial Number PCT/EP2021/067445, filed Jun. 25, 2021, which claims priority to German Patent Application No. DE 10 2020 208 164.6, filed Jun. 30, 2020, the entire contents of which are incorporated herein by reference.

FIELD

The present disclosure generally relates to steering mechanisms, including motor vehicle steering columns that include an inner casing.

BACKGROUND

A steering column for a motor vehicle has a steering shaft with a steering spindle mounted rotatably in a casing unit about its longitudinal axis, at the rear end of which steering spindle in the direction of travel and facing the driver a steering wheel for the introduction of a steering command by the driver is fitted. The casing unit is held by a supporting unit fastened to the vehicle body, wherein the adjustment of the steering wheel position relative to the vehicle body can be enabled by the adjustment of the casing unit relative to the supporting unit.

A longitudinal adjustment, in the case of which the steering wheel can be adjusted to the rear or to the front in the longitudinal direction, i.e. in the direction of the longitudinal axis relative to the driver's position, is enabled in the case of a generic steering column as a result of a telescopic configuration of the casing unit and the steering spindle. The steering column can furthermore be pushed together in the longitudinal direction in the event of a crash, as a result of which the steering column can be effectively prevented from penetrating into the interior of the passenger compartment and leading to injury of the occupants. If, in the event of a crash, a body strikes the steering wheel, the energy input in this case can be reduced, i.e. dissipated, in a controlled manner during pushing together of the steering column in order to reduce the risk of injury.

The casing unit has at least one inner casing, also referred to as an inner casing tube, which is immersed in a coaxially telescopic manner into an outer casing, also referred to as an outer casing tube, and is guided therein in a telescopically displaceable manner in the longitudinal direction defined by the longitudinal axis. By pushing together or pulling part the casing tubes in the longitudinal direction, the casing unit and thus the steering column can be correspondingly shortened or lengthened for adjustment.

The inner casing is guided in a sliding manner in the longitudinal direction in the outer casing. In order to be able to specify a defined and consistent adjusting force which must be applied for longitudinal adjustment, and thereby simultaneously ensure a high degree of rigidity of the steering column, a configuration of the sliding guide with a low degree of play is necessary. To this end, it is known, for example, from CN 208827919 U to attach a sliding surface to a pressure piece which lies externally against the inner casing. This pressure piece is held on the outer casing in the longitudinal direction and connected to a pretensioning apparatus attached to the outer casing. A defined pretensioning force can be applied by the pretensioning apparatus in a tensioning direction transversely to the longitudinal axis, i.e. radially from the outside towards the longitudinal axis, onto the pressure piece, with which said pressure piece is pressed with a low degree of play or no play into sliding contact with a defined pretensioning force against the inner casing. In this case, the pressure piece is held in the longitudinal direction on the outer casing and supported counter to the tensioning direction, i.e. counter to the direction of the pretensioning force, against a fixing element of the pretensioning apparatus. In the prior art, the fixing element is a threaded bolt which is fixed in a recess of the outer casing which is formed as a corresponding threaded bore.

One advantage of the known pretensioning apparatus is that, by screwing the fixing element into the recess, the pretensioning force exerted via the pressure piece on the sliding guide and thus the adjusting force and the rigidity of the steering column can be adjusted. During screwing in and tightening of the fixing element, the thread friction which itself is influenced by the actual state of the thread, the pretensioning force and further conditions must, however, necessarily be overcome. As a result of this, the disadvantage arises that, as a result of the screwing in of the fixing element, the pretensioning force actually acting in the sliding contact can only be defined with insufficient precision. It can furthermore be disadvantageous that the adjusted pretensioning force changes by releasing the fixing element or this is disadvantageously changed by later intervention (manipulation in the field) by unqualified persons if the fixing element is screwed in or screwed out further.

Thus a need exists for an improved adjustment of the pretensioning force which is stable in the long term and which simultaneously offers improved protection against manipulation.

DETAILED DESCRIPTION

Figure 1:
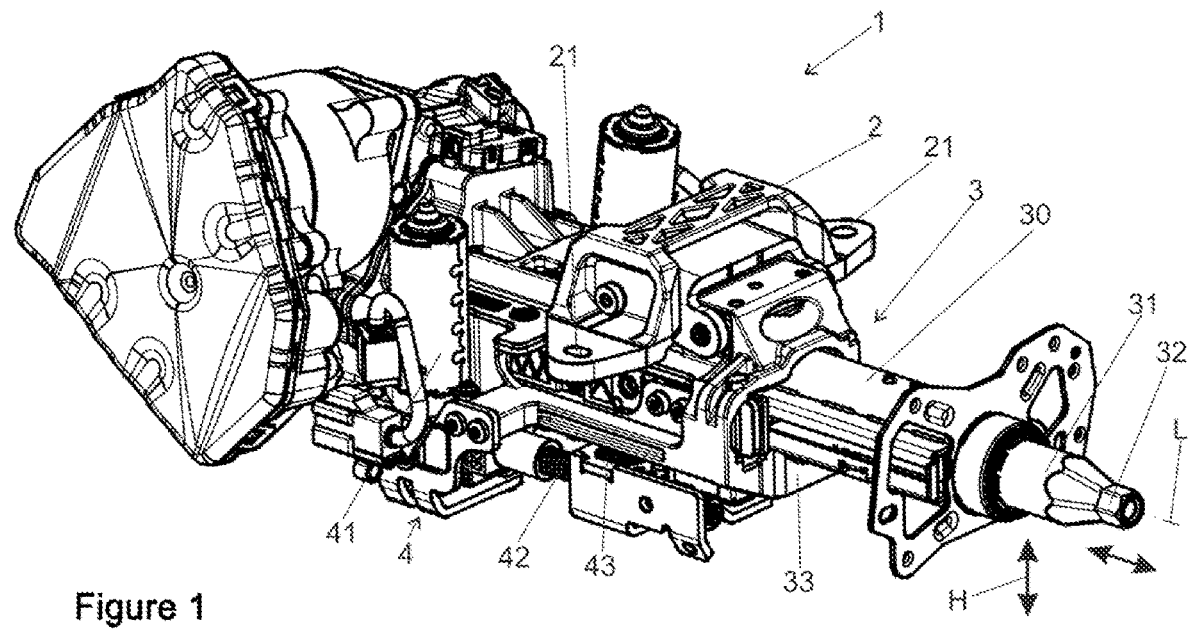
FIG. 1 is a perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In one example, a steering column may include an inner casing in which a steering spindle is mounted rotatably about a longitudinal axis extended in the longitudinal direction and which is received in the outer casing in a slidingly adjustable manner in the longitudinal direction. The steering column may also include a pretensioning apparatus, with a pressure piece which can be braced from the outside in a tensioning direction transversely to the longitudinal axis against the inner casing, which pressure piece is held in the longitudinal direction on the outer casing and is supported against a fixing element counter to the tensioning direction, which fixing element is fixed in a recess of the outer casing. The present disclosure furthermore relates to methods for adjusting steering columns.

In the case of a steering column for a motor vehicle, comprising an inner casing in which a steering spindle is mounted rotatably about a longitudinal axis extended in the longitudinal direction and which is received in the outer casing in a slidingly adjustable manner in the longitudinal direction, and comprising a pretensioning apparatus, with a pressure piece which can be braced from the outside in a tensioning direction transversely to the longitudinal axis against the inner casing, which is held in the longitudinal direction on the outer casing and is supported against a fixing element counter to the tensioning direction, which fixing element is fixed in a recess of the outer casing, it is provided according to the invention that the fixing element has at least one forming means which is plastically furrowed into the recess, and/or the recess has a forming means which is plastically furrowed into the fixing element.

According to the invention, for the purpose of fixing, at least one forming means is provided on the fixing element and alternatively or additionally in the region of the recess on the outer casing. In this case, this forming means or element forms a type of forming tool, i.e. a tool element, which, for the purpose of fixing, brings about a plastic forming of the fixing element and/or the outer casing, concretely the recess of the outer casing. As a result of this forming, a preferably undetachable connection is generated between the fixing element and the outer casing so that the possibility of subsequent manipulation by unqualified persons is prevented or at least significantly reduced. For example, form-fitting elements can be generated by the forming generated during fixing by the forming means, by means of which form-fitting elements the fixing element is clearly positioned in the longitudinal direction and in the tensioning direction and is durably fixed in place. The form-fitting elements generated in such a manner preferably form an undetachable connection. This has the advantage over the prior art that the pretensioning force adjusted during fixing of the pressure piece can no longer be changed and is therefore stable in the long term.

The pressure piece is preferably formed as a pressure piece which slides in the longitudinal direction on the inner casing.

It is assumed below that the direction of extent of the recess is identical to the tensioning direction, i.e. is directed radially with respect to the longitudinal axis. The pressure piece is correspondingly braced by the pretensioning apparatus in this tensioning direction or direction of extent from the outside against the inner casing, preferably orthogonally to the longitudinal direction.

Due to the fact that the forming means is furrowed, it is molded or embedded plastically into the material of the fixing element and/or the outer casing in such a manner that form-fitting elements which are dug into one another, preferably undetachably, are formed. As a result of these form-fitting elements formed according to the invention, the fixing element can be durably and reliably secured in the recess in the tensioning direction, which corresponds to the direction of extent of the recess, in the longitudinal direction and also in terms of rotation in the recess, i.e. rotation about the tensioning direction. Therein lies a further advantage over the prior art which would make additional measures for the purpose of securing necessary, which means additional manufacturing outlay.

It is furthermore advantageous that the plastic forming according to the invention can be performed by incorporation of a forming force independently of the pretensioning force exerted by the fixing element on the pressure piece during adjustment. As a result of this, the pretensioning force can be specified in a defined and precise manner in a different fashion to that in the prior art, and be durably fixed due to the independent plastic deformation by incorporation of a forming force, without a subsequent manipulation like the prior art easily being possible. It can preferably be provided in this regard that the pretensioning force and the forming force do not have any joint force components. For example, the pretensioning force and the forming force can be directed orthogonally to one another. This can be realized, for example, in that the pretensioning force acts in the tensioning direction, i.e. in the direction of extent of the recess orthogonally to the longitudinal axis on the pressure piece, and the forming force is exerted in directions within a plane which is parallel to the longitudinal axis.

The recess can preferably be formed as a continuous opening. This then preferably forms a through opening which is open to the outside radially with respect to the longitudinal axis in the outer casing. The fixing element can be inserted into the opening in the tensioning direction from the outside, and load and pretension the pressure piece likewise preferably arranged in the through opening with the pretensioning force against the inner casing.

The recess and the fixing element can preferably have a round base cross-section. In this regard, the fixing element can have a cylindrical base body which extends axially in the opening in the tensioning direction which corresponds to the direction of extent of the opening. The recess can be formed, for example, as an opening with a corresponding round base cross-section, into which opening the cylindrical fixing element can be axially inserted.

The forming means according to the invention can preferably be arranged on the outer circumference of the fixing element, and additionally or alternatively on the inner circumference of the recess which is directed counter to the fixing element.

It can be advantageous that the pressure piece has a sliding element which lies against the inner casing or a rolling element which lies against the inner casing. A sliding element can be formed, for example, from a material which has a good sliding capacity on the inner casing typically manufactured from steel, for example, a plastic, a non-ferrous metal or the like. The sliding element can be formed as a sliding body composed of such a material which itself can form the pressure piece. Alternatively, a coating can also be provided which can also be arranged on the fixing element, and additionally or alternatively on the inner casing. It is furthermore conceivable and possible that the sliding element is formed as a foil applied onto the pressure piece which is glued, for example, onto the pressure piece.

The pressure piece can preferably have a rolling element which is mounted on the pressure piece and can roll on the inner casing. The rolling element can preferably be formed as a roller and/or as a ball. The pressure piece can preferably have one or more rolling elements.

The pressure piece and the fixing element can be formed separately and supported against one another in the tensioning direction. It is also possible that the pressure piece and the fixing element are connected to one another or are formed integrally.

The inner casing and the outer casing can have a circular-cylindrical cross-sectional profile or a cross-sectional profile which deviates from the circular-cylindrical form, for example, a non-round cross-sectional profile such as a polygonal profile (triangular, rectangular, hexagonal, octagonal or with n angles, wherein n∊ℕ). The inner casing and outer casing are preferably formed as tubes, wherein tube should be understood in the sense of a hollow profile, wherein these can also have slots, recesses and the like. The inner casing and/or the outer casing are preferably formed from a metallic material such as steel or an aluminum alloy. The inner casing and/or the outer casing can preferably be formed as a welded component or as a cast component.

It can preferably be provided that a spring element is arranged between the fixing element and the pressure piece. Due to the fact that the spring element is arranged in the tensioning direction between the fixing element and the pressure piece, it can generate and maintain the pretensioning force elastically by means of its spring force. The exerted pretensioning force can be adjusted and fixed by more pronounced or less pronounced pushing of the fixing element in the tensioning direction and subsequent fixing by means of the plastic molding according to the invention. A pressure spring can preferably be used as a spring element, for example, spring rings, plate springs, Woodruff keys or helical springs or the like.

One advantageous embodiment of the invention is that the forming means has a tool element formed for non-cutting forming. For the purpose of fixing, a forming force is applied between outer casing and fixing element so that the forming means is plastically molded. In this case, a non-cutting forming method such as, for example, pressing, compressing, bending, squeezing, extruding, embossing or the like has the advantage that, during fixing, no chips or particles arise which could impair the function of the steering column. Moreover, a durable joining structure which can withstand high loads can be generated by non-cutting forming, as a result of which a high holding action can be generated which is in particular more pronounced than in the prior art.

It is advantageously possible that the forming means has a toothing. The toothing can be arranged on the fixing element, and additionally or alternatively on the outer casing, preferably in each case on the inner and outer surfaces which come into contact with one another. A toothing can be easily generated in terms of production technology and adapted in terms of shape and dimensions in order to generate an optimized plastic furrowing or molding. For example, the toothing can be rounded in order to be able to generate a non-cutting forming. It can be provided that the toothing is formed as a longitudinal knurl.

It can be provided that the toothing has at least one toothed rib which is formed at least in portions circumferentially in a circumferential direction on the fixing element and/or in the recess. A toothed rib can be formed by a tooth which projects in a web-like manner and is longitudinally extended, wherein the tooth has a tooth point with adjacent tooth flanks. Such a toothed rib can be arranged circumferentially externally around the fixing element and/or internally in the recess in relation to the extent of the recess. Several toothed ribs can preferably be arranged with a spacing so that a type of grooving or fluting is generated. If the fixing element and the recess or opening have a cylindrical base form, the toothed ribs preferably run coaxially at least in portions. In this case, the toothed ribs extend transversely to the tensioning direction, and are therefore referred to as a transverse toothing. Due to the fact that the toothed ribs of the transverse toothing are plastically furrowed into the fixing element and/or the recess, a form-fitting connection which acts in the tensioning direction is generated. This connection is undetachable and stable in the long term and ensures reliable maintenance of the pretensioning force.

Due to the fact that the toothed ribs of the transverse toothing are plastically furrowed into the fixing element and/or the recess, a form-fitting connection which acts in the tensioning direction can be generated in that a forming force is exerted in the circumferential direction between the fixing element and the outer casing.

It can be provided that the toothing has at least one toothed rib which is formed at least in portions in the tensioning direction on the fixing element and/or in the recess. One or more toothed ribs can extend in the direction of extent of the recess, i.e. transversely in relation to a circumferential direction externally on the fixing element and/or internally in the recess. This type of toothing is referred to as longitudinal toothing. Due to the fact that the toothed ribs of the longitudinal toothing are plastically furrowed into the fixing element and/or the recess, a form-fitting connection which acts in the circumferential direction. i.e. transversely to the tensioning direction can be generated. As a result of this, an undesirable rotation of the fixing element in the recess can be effectively prevented.

A combination of a longitudinal and a transverse toothing can be realized, for example, a transverse toothing externally on the fixing element, and a longitudinal toothing internally in the recess, or vice versa. In the case of the plastic connection according to the invention, the toothed ribs are plastically furrowed into one another in a cross-wise manner. This has on one hand the advantage in terms of manufacturing technology that a smaller forming force is required than if a toothed rib is furrowed into a smooth surface. A further advantage is that material which is plastically displaced during furrowing remains in the contact region between fixing element and recess and in this case can form particularly effective form-fitting elements.

The toothing can be preferably plastically molded on the fixing element and/or in the recess, for example, by embossing, knurling, rolling or the like. This enables cost-effective manufacture, and, as a result of the non-cutting forming, a high degree of stability and holding force.

One advantageous further development provides that the fixing element and the recess have bayonet segments which correspond to one another, extend in each case in a segment-like manner over a circumferential sub-portion, have at least partially forming means and are arranged and configured in order to enable, in a relative insertion orientation, the insertion of the fixing element in the tensioning direction into the recess, and are plastically furrowed in the fixing element and/or the recess in a fixing or locking orientation rotated relative to the insertion orientation. In this embodiment, the fixing element and the recess are formed in a similar manner to a bayonet joint, wherein it is assumed below for simpler explanation that the fixing element and the recess formed as an opening have a cylindrical base form corresponding to one another.

In the recess, at least one or more bayonet segments project inwards, i.e. transversely to the insertion direction, i.e. transversely to the tensioning direction, into the opening cross-section, wherein in the circumferential direction between the circumferential-side ends of the bayonet segment(s) in each case at least one circumferential gap is free. At least one bayonet segment projects from the fixing element outwardly transversely to the insertion direction which has, measured in the circumferential direction, smaller dimensions than the stated circumferential gap. In other words, the bayonet segments extend from the fixing element and recess taken together over less than 360°. The cross-section, i.e. the diameter of the preferably cylindrical base body of the fixing element is smaller than the through cross-section which remains free between the bayonet segment(s) of the recess. As a result of this, the fixing element can be inserted in the tensioning or insertion direction, in an insertion orientation in which the bayonet segments and the circumferential gaps have a gap relative to one another, in the tensioning direction into the recess, wherein the bayonet segment of the fixing element can be moved through the circumferential gap of the recess in the insertion direction. The bayonet segments overlap in the axial direction, i.e. as seen in the insertion or tensioning direction. If the inserted fixing element is now rotated relative to the recess, the bayonet segments are moved in the circumferential direction against one another until they at least partially overlap. In this case, the forming elements arranged on the bayonet segments are at least partially furrowed. The forming elements can preferably have toothed ribs, running in the circumferential direction, of a transverse toothing which are furrowed in the circumferential direction into the corresponding bayonet segments.

One particular advantage of the bayonet-like formation is that the fixing element can be pressed through the recess with the precisely defined pretensioning force against the pressure piece without disadvantageous influencing as a result of contact between the fixing element and the recess arising as is the case in the prior art. Independently of the pretensioning force, the forming force can be applied by a torque with which the fixing element in the recess is rotated. As a result of this, the pretensioning force and the forming force are orthogonal to one another so that disadvantageous mutual influencing can be avoided.

In the fixed state, the bayonet segments furrowed or formed at least partially plastically engage in one another and ensure a secure, resilient and durable, preferably undetachable connection.

In one advantageous embodiment, it can be provided that a forming means has a higher degree of hardness than the material into which it is furrowed. A higher degree of hardness can be provided by at least partial use of a harder material, for example, also by a hardening or hard coating. For example, the fixing element can be continuously harder or at least in the region of toothed ribs or other forming means than the outer casing in the region of the recess so that, during furrowing, the recess is formed to be partially stronger than the fixing element or vice versa.

It is possible that the steering column has one, two or more pretensioning devices according to the invention. Here, the recesses can be arranged behind one another in the longitudinal direction in the outer casing, preferably with a spacing in the longitudinal direction. Alternatively or additionally, pretensioning apparatuses can be arranged offset in the circumferential direction about the longitudinal axis.

It can be provided that an electric adjusting drive engages on the outer casing and the inner casing. A motorically drivable linear drive, for example, a spindle drive which is known per se and can be electromotively driven and is inserted between outer casing and inner casing can be provided as a longitudinal adjusting drive for longitudinal adjustment.

The casing unit formed from outer and inner casing can be held in a supporting unit which can be connected to a vehicle body. This casing unit can be mounted on the supporting unit in a height-pivotable manner about a pivot axis which lies transversely to the longitudinal axis, i.e. orthogonally to the longitudinal axis. As a result of the pivoting about this horizontal pivot axis, a height adjustment can be realized in the case of which the steering wheel attached to the rear end of the steering spindle can be adjusted in terms of the height relative to the driver's position.

The height adjustment can be performed manually. In particular for automated stowing away of the steering column during autonomous driving, it is advantageous that an electric height adjusting drive is connected to the supporting unit and the actuating unit, by means of which the actuating unit can be moved relative to the supporting unit about the pivot axis. A height adjusting drive is likewise known per se and can be realized, for example, as an electromotively driven spindle drive, as described above for the longitudinal adjustment.

The invention furthermore comprises a method for adjusting a steering column, which has an inner casing in which a steering spindle is mounted rotatably about a longitudinal axis extended in the longitudinal direction, and which is received in an outer casing in a slidingly adjustable manner in the longitudinal direction by the adjusting force, and comprising a pretensioning apparatus, with a pressure piece which can be braced from the outside in a tensioning direction with a pretensioning force against the inner casing, which is held in the longitudinal direction on the outer casing and is supported against a fixing element counter to the tensioning direction, which fixing element is fixed in a recess of the outer casing, characterized by the steps:
applying a pretensioning force onto the fixing element,
detecting a measurement value correlated with the adjustment and comparison with a reference value,
fixing the fixing element on the outer casing in the event of the measurement value corresponding to the reference value within a predefined tolerance range.

In the case of the method according to the invention, all the approaches stated above to execute a steering column according to the invention can be used.

The inner casing is initially arranged in the outer casing, and the pressure piece is positioned in a recess, preferably formed as an opening, of the outer casing.

The fixing element is subsequently loaded with a pretensioning force in relation to the longitudinal axis radially from the outside against the pressure piece, for example, by insertion into the opening, as described above in relation to the bayonet-type embodiment. The pretensioning force is preferably applied linearly in the tensioning direction onto the fixing element. The pressure piece is pressed in this case by the fixing element with the pretensioning force in the sliding contact against the inner casing.

During application of the pretensioning force, a measurement value is detected which enables an assessment as to whether the pretensioning of the pressure piece is adjusted to ensure the required properties of the steering column. For example, an adjusting force for adjusting the inner casing in the outer casing can be measured as a measurement value. The displacing force in the longitudinal direction to be applied for telescopic adjustment of the inner casing in the outer casing can be measured as an adjusting force. It is also conceivable and possible to measure a variable which corresponds to the adjusting force as a measurement value, for example, a current or a voltage of a suitable measuring sensor.

It is likewise possible in one embodiment variant to use the pretensioning force itself as a measurement value. This is possible since the active coefficient of friction between the pressure piece and the inner casing can be determined and via this the adjusting force can be determined by means of Coulomb's law of friction or alternatively a correlation can be drawn between pretensioning force and adjusting force in advance by means of a series of tests.

If the required pretensioning force is adjusted, this is maintained, and the fixing element is fixed on the outer casing. It is preferably provided in this regard that the fixing is performed by application of a fixing force which is independent of the adjusting force, preferably a forming force, onto the fixing element relative to the outer casing. The fixing force and the pretensioning force preferably do not have any joint force component. As a result of this, the pretensioning force can advantageously be specified during fixing precisely and in a manner which is not influenced by the fixing force.

A forming force can preferably be applied as a fixing force between the fixing element and the outer casing, by means of which forming force the fixing element and the outer casing are connected to one another by plastic forming, as is described above for the configuration according to the invention of the steering column. One advantageous example is fixing in the case of the bayonet-like configuration, in the case of which the pretensioning force is introduced linearly radially from the outside, and the shaping force required for furrowing by rotation of the fixing element in the recess of the outer casing.

Figure 2:
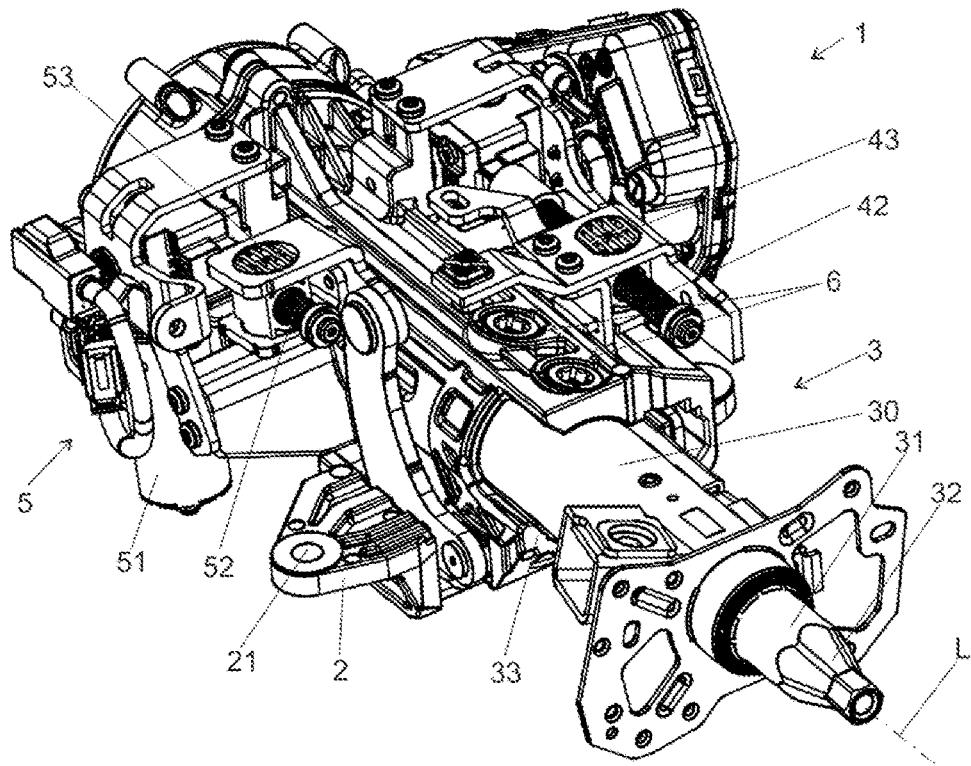
FIG. 2 is another perspective view of the steering column according to FIG. 1.

In FIGS. 1 and 2, a steering column 1 according to the invention is represented schematically in a perspective view obliquely from the rear (relative to the direction of travel of a motor vehicle, not shown) from above (FIG. 1) and from below (FIG. 2).

The steering column 1 can be fastened to the chassis of a motor vehicle, not represented, by means of a supporting unit (console) 2 which comprises fastening means 21 for connection to the chassis.

A casing unit 3 comprises an inner casing 30, also referred to as an inner casing tube, in which a steering spindle 31 is mounted rotatably about their longitudinal axis L which extends from the front in the longitudinal direction. A fastening portion 32 for fastening a steering wheel, not represented, is formed to the rear of the steering spindle 30.

The inner casing 31 is received to be telescopically displaceable in the longitudinal direction in an outer casing 33, also referred to as an outer casing tube, as indicated by the double arrow.

A motoric longitudinal adjusting drive 4 comprises an electric drive unit 41 with an electric motor which is supported on the outer casing unit 33 in the longitudinal direction and by means of which a thread spindle (spindle) 42 extending substantially in the longitudinal direction can be rotationally driven, which spindle is screwed into a spindle nut 43 arranged in a rotationally conjoint manner with respect thereto and is supported on the inner casing tube 31 in the longitudinal direction. As a result of this, a rotational spindle drive is realized, in the case of which the distance in the longitudinal direction between drive unit 41 and spindle nut 43 is adjustable by rotational driving of the threaded spindle 42. By activating the drive unit 41, the inner casing tube 31 can be telescopically retracted or extended relative to the outer casing unit 33 for longitudinal adjustment of the steering column 1, as is indicated with a double arrow.

A height adjusting drive 5 is, like the length adjusting drive 4, likewise formed as an electro-motive spindle drive with a motoric drive unit 51, and a threaded spindle 52 which can be rotationally driven thereby and which is screwed into a spindle nut 53. The adjusting drive 5 is arranged between the supporting unit 2 and the casing unit 3, and enables a motoric adjustment of the steering spindle 30 in height direction H.

The outer casing 33 has two pretensioning apparatuses 6 according to the invention which are arranged at a distance from one another in the longitudinal direction and which are of identical design.

Figure 3:
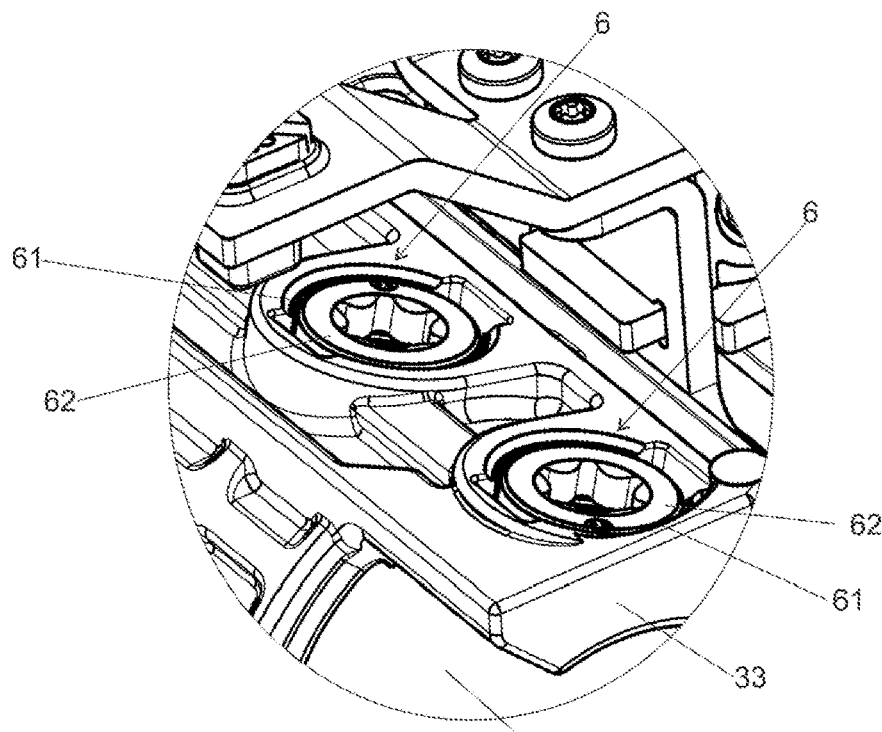
FIG. 3 is a detail, perspective view of an example pretensioning apparatus of the steering column according to FIG. 1.
Figure 4:
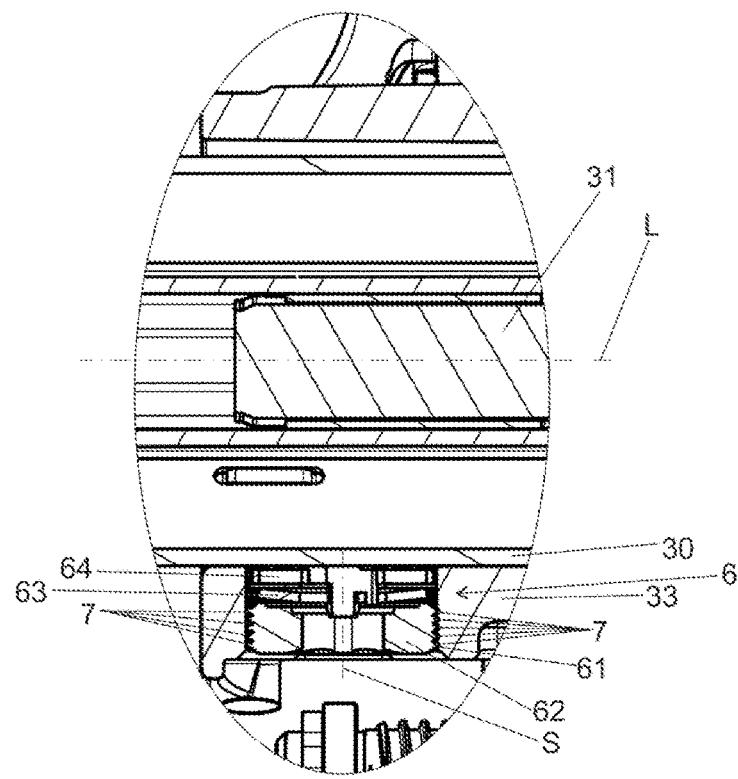
FIG. 4 is a longitudinal sectional view through the pretensioning apparatus according to FIG. 3.
Figure 5:
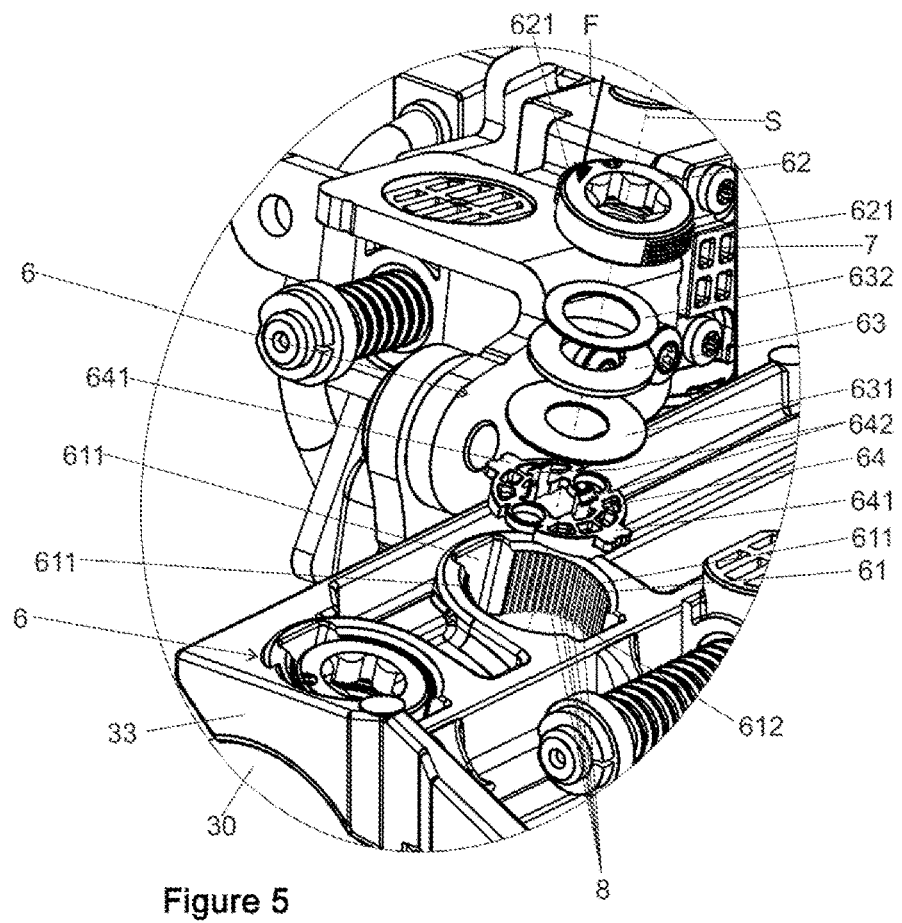
FIG. 5 is a schematic, exploded view of the pretensioning apparatus according to FIG. 3.
Figure 6:
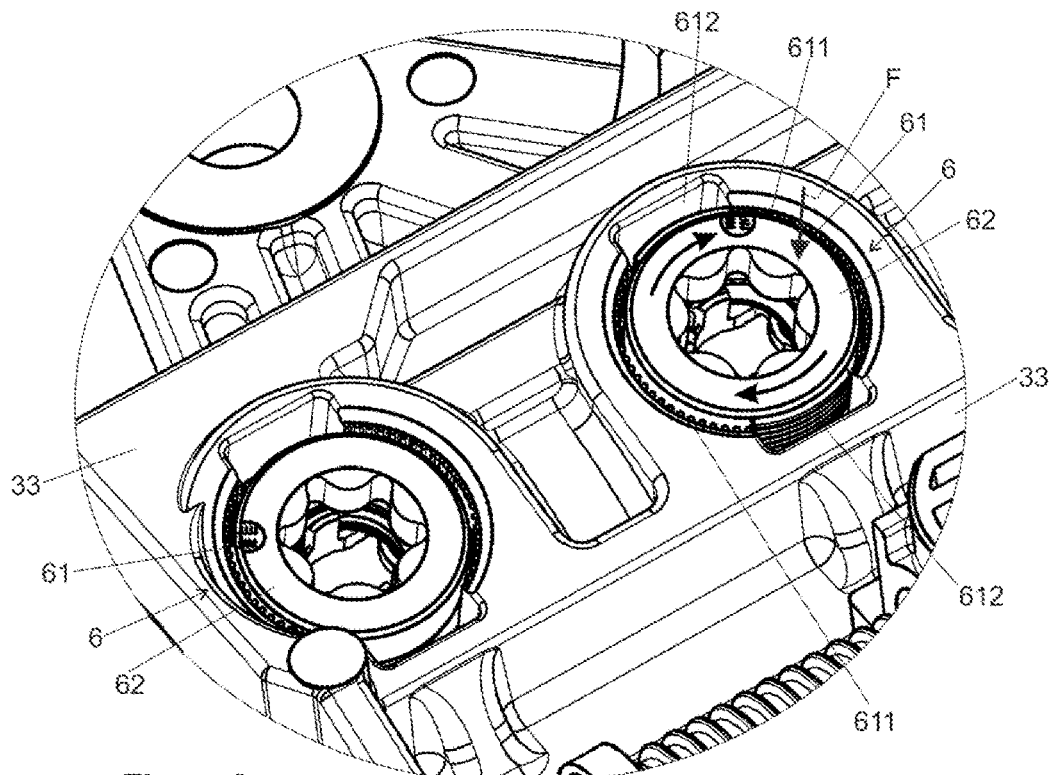
FIG. 6 is a further perspective view of the pretensioning apparatus according to FIG. 3.

The pretensioning apparatus 6 is shown in an enlarged form in FIGS. 3 and 6 in a perspective view. FIG. 5 shows a pretensioning apparatus 6 in a mounted state, and one in a schematic exploded representation. FIG. 4 shows in cut-out a longitudinal section through the casing unit 3 in the region of a pretensioning apparatus 6.

Each pretensioning apparatus 6 comprises a recess in the form of a continuous opening 61 through the outer casing 33, which opening 61 extends transversely to the longitudinal axis L in the tensioning direction S which is also referred to as the insertion direction or extension direction. A fixing element 62, a spring element formed as plate spring 63, and a pressure piece 64 are arranged in the opening 61.

It is apparent in the cross-section of FIG. 4 that the pressure piece 64 in the sliding contact lies radially from the outside against the inner casing 30.

The fixing element 62 has on its outer circumference two bayonet segments 621 which extend in each case over a circumferential sub-region and are apparent in FIG. 5 as hatched circumferential sub-regions, and toothed ribs 7 which are circumferential there in the circumferential direction, which therefore run transversely to the tensioning direction S, project to the outside and are apparent in the section from FIG. 4. A multiplicity of these toothed ribs 7 are arranged consecutively in tensioning direction S so that a type of corrugated transverse toothing is formed. The bayonet segments 621 are spaced apart in the circumferential direction by circumferential gaps 622, as is apparent in FIG. 5.

The opening 61 has on its inner circumference two bayonet segments 611 which extend in each case over a circumferential sub-region and are apparent in FIG. 5 as hatched circumferential sub-regions. These have in each case a multiplicity of toothed ribs 8 running in tensioning direction S which project radially inwards and are arranged next to one another in the circumferential direction. Circumferential gaps 612 which are molded as grooves running longitudinally in tensioning direction S into the inner wall are located between the bayonet segments 611.

For the purpose of mounting, a pressure piece 64 is inserted in tensioning direction S from outside the opening 61, wherein projections 641 projecting laterally on the pressure piece 64 engage into the circumferential gaps 612 and create a form-fitting rotation lock.

The plate spring 63 which is arranged between two washers 631 and 632 is subsequently inserted.

Thereafter, the fixing element 62 is moved into an insertion orientation in which the bayonet segments 621 are located in the circumferential region of the circumferential gaps 612 of the opening 61. Due to the fact that the circumferential sub-region of the bayonet segments 621 is smaller than that of the circumferential gaps 612, and the diameter of the base body of the fixing element 62 outside the bayonet segments 621 without the toothed ribs 7 is smaller than the diameter of the opening cross-section between the inwardly projecting toothed ribs 8 in the circumferential region of the bayonet segments 611, the fixing element 62 can be inserted in a contact-free manner in the tensioning direction S into the opening 61.

A pretensioning force F can thus be applied from outside onto the fixing element 62 which is transmitted via the plate spring 63 and the washers 631 and 632 onto the pressure piece 64 which is consequently pressed with this pretensioning force F in the sliding contact against the inner casing 30. The pretensioning force F is plotted schematically in FIGS. 5 and 6.

If the required value of the pretensioning force F is reached, the fixing element 62 is rotated about the tensioning direction S in the opening 61 by means of introduction of a forming force or forming torque, and as a result moved into a fixing or locking orientation, as indicated in FIG. 6 by the curved arrows. As a result of this, the bayonet segments 621 of the fixing element 62 are moved with a forming force acting in the circumferential direction into the bayonet segments 611 of the opening 61. In this case, the toothed ribs 7 of the bayonet segments 621 are plastically furrowed in the region of the bayonet segments 611 into the inner wall of the opening 61. As a result of this, a plastic forming is generated which generates an undetachable plastic connection of the fixing element 62 in the opening 61. As a result of this, the pressure piece 64 is tensioned durably and undetachably with the pretensioning force F generated by the plate spring 63 against the inner casing 30.

It can preferably be provided that the pressure piece 64 has latching elements 642 so that the plate spring 63 and the washers 631 and 632 are premounted on the pressure piece 64 prior to insertion into the opening 61 and are held on the pressure piece 64 by the latching elements 642. The washers 631 and 632 serve the purpose of secure fixing of the plate spring 63 on the pressure piece 64 and the purpose of improved force distribution, these thus being advantageous and can be optionally used. Other types of springs can also be combined with the plate spring, or these can be provided instead of plate springs. Moreover, more than one plate spring can also be provided, what is known as a plate spring pack.

The formation of the pressure piece 64 and the plate spring 63 and the washers 631 and 632 is not inseparably linked to the formation of the fixing element 62 and their fixing in the outer casing 33 and can correspondingly be formed in a different manner. It is thus conceivable and possible that the fixing element acts directly on the pressure piece without interconnection of a plate spring and washers or the pressure piece and the fixing element are formed as a component which is integral in one piece.

LIST OF REFERENCE NUMBERS

1 Steering column
2 Support unit
21 Fastening means
3 Casing unit
30 Inner casing
31 Steering spindle
32 Fastening portion
33 Outer casing
4, 5 Adjusting drive
41, 51 Drive unit
42, 52 Threaded spindle
43, 53 Spindle nut
6 Pretensioning apparatus
61 Opening
611 Bayonet segment
612 Circumferential gaps
62 Fixing element
621 Bayonet segments
622 Circumferential gaps
63 Plate spring
631 Washer
632 Washer
64 Pressure piece
641 Projection
642 Latching element
641 Projections
7, 8 Toothed ribs
Longitudinal axis L
Tensioning direction S
Pretensioning force F

What is claimed is:

1. A steering column for a motor vehicle, comprising:
an inner casing in which a steering spindle is mounted rotatably about a longitudinal axis that extends in a longitudinal direction;
an outer casing in which the inner casing is received in a slidingly adjustable manner in the longitudinal direction; and
a pretensioning apparatus with a pressure piece that is configured to be braced from an outside in a tensioning direction transversely to the longitudinal axis against the inner casing, wherein the pressure piece is held in the longitudinal direction on the outer casing and is supported against a fixing element counter to the tensioning direction, wherein the fixing element is fixed in a recess of the outer casing, wherein at least one of:
the fixing element has a forming means that is plastically furrowed into the recess, or
the recess has a forming means that is plastically furrowed into the fixing element.

2. The steering column of claim 1 wherein the forming means has a tool element configured for non-cutting forming.

3. The steering column of claim 1 wherein the forming means has a toothing.

4. The steering column of claim 3 wherein the toothing includes a toothed rib that is configured at least in portions circumferentially in a circumferential direction on the fixing element and/or in the recess.

5. The steering column of claim 3 wherein the toothing includes a toothed rib that is configured at least in portions in the tensioning direction on the fixing element and/or in the recess.

6. The steering column of claim 1 wherein the fixing element and the recess have bayonet segments that correspond to one another; that extend in each case in a segment-like manner over a circumferential sub-portion; that have at least partially forming means; that are arranged and configured to enable, in a relative insertion orientation, insertion of the fixing element in the tensioning direction into the recess;

and that are plastically furrowed in the fixing element and/or the recess (61) in a locking orientation rotated relative to the insertion orientation.

7. The steering column of claim 1 wherein the recess is a continuous opening.

8. The steering column of claim 1 wherein the recess and the fixing element have a round base cross-section.

9. The steering column of claim 1 comprising a spring element disposed between the fixing element and the pressure piece.

10. The steering column of claim 1 wherein the pressure piece includes a sliding element that lies against the inner casing or a rolling element that lies against the inner casing.

11. The steering column of claim 1 comprising an electric adjusting drive that engages on the outer casing and the inner casing.

* * * * *